US006372361B1

(12) United States Patent
Mackewicz et al.

(10) Patent No.: US 6,372,361 B1
(45) Date of Patent: Apr. 16, 2002

(54) COATING FOR PAPER PRODUCTS

(75) Inventors: Victor L. Mackewicz, Califon; Robert L. Billmers, Stockton; Douglas J. Hanchett, Wharton, all of NJ (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 0 days.

(21) Appl. No.: 09/611,862

(22) Filed: Jul. 7, 2000

(51) Int. Cl.⁷ .................. B32B 23/06; D21H 19/54; B05D 3/00
(52) U.S. Cl. .............. 428/537.5; 162/135; 162/175; 427/395
(58) Field of Search ............... 162/175, 135; 428/537.5; 427/395

(56) References Cited

U.S. PATENT DOCUMENTS

| | | | |
|---|---|---|---|
| 2,661,349 A | * 12/1953 | Caldwell et al. | 536/63 |
| 3,640,842 A | * 2/1972 | Hullinger et al. | 162/175 |
| 4,278,583 A | 7/1981 | Sekiya | 260/29.7 |
| 4,361,669 A | 11/1982 | Evans et al. | 524/424 |
| 4,626,288 A | * 12/1986 | Trzasko et al. | 106/210 |
| 4,837,087 A | 6/1989 | Floyd et al. | 428/511 |
| 4,857,126 A | 8/1989 | Soremark et al. | 156/205 |
| 4,872,951 A | * 10/1989 | Maliczyszyn et al. | 162/135 |
| 5,672,699 A | 9/1997 | Billmers et al. | 536/102 |
| 5,690,853 A | 11/1997 | Jackson et al. | 219/727 |
| 5,773,801 A | * 6/1998 | Blamer et al. | 219/727 |
| 5,776,619 A | 7/1998 | Shanton | 428/511 |
| 5,849,128 A | 12/1998 | Hara et al. | 156/244.11 |

FOREIGN PATENT DOCUMENTS

| EP | 1 076 067 A | 2/1901 |
|---|---|---|
| EP | 0 902 037 A | 3/1999 |

OTHER PUBLICATIONS

U.S. application No. 09/568,111, Billmers et al., filed May 10, 2000.
Miles, Marvyn J., Victor J. Morris, Paul D. Orford and Stephen G. Ring; "The Roles of Amylose and Amylopectin in the Gelation and Retrogradation of Starch", AFRC Food Research Institute, Jul. 9ᵗʰ, 1984.

* cited by examiner

*Primary Examiner*—Fred J. Parker
*Assistant Examiner*—Elena Tsoy
(74) *Attorney, Agent, or Firm*—Laurelee Duncan, Esq.

(57) ABSTRACT

A paper coating comprising a hydrophobically modified starch having an amylose content of less than about 40% by weight. The coating provides the paper product with oil and grease resistant properties.

17 Claims, No Drawings

COATING FOR PAPER PRODUCTS

FIELD OF THE INVENTION

The invention relates to a paper surface treatment and compositions for the treatment of paper products which impart an oil and grease resistant barrier to such products. In particular, the invention is directed to paper products treated with a coating, more specifically, an oil and grease resistant coating.

BACKGROUND OF THE INVENTION

Coating and surface sizing of paper is conventionally used in the paper industry to provide barrier properties and other desired and beneficial attributes to paper. Properties which are provided to paper by coating compositions include porosity reduction to air, water resistance, oil and grease resistance, higher surface strength and properties which effect the quality and ease of printing on the paper.

Various materials and compositions have been used in the art to coat the surface of paper. Starch and polyvinyl alcohol have been used as components in different coating compositions. U.S. Pat. No. 4,278,583, U.S. Pat. No. 4,837,087 and U.S. Pat. No. 5,292,781 describe the use of starch and polyvinyl alcohol as binders in paper coating compositions. While the use of polyvinyl alcohol has been well documented in the patent literature, see also U.S. Pat. No. 5,849,128, its use has many drawbacks including machine runability, tackiness and unfavorable rheology.

A coating composition which is widely used commercially to impart oil and grease resistance to paper contains fluorochemicals. While such coating compositions are quite effective, they are not environmentally friendly and raise various health and safety concerns.

There is thus a need in the art for coating compositions for use in the production of oil and grease resistant papers, in particular paper products used for food packaging, which is safe for the environment and the consumer.

SUMMARY OF THE INVENTION

The present invention fulfills this need by providing a paper coating composition for oil and grease resistance that is formulated from food grade ingredients, so is both environmentally friendly and safe for the consumer.

The invention relates to a paper coating composition that provides good barrier properties. The paper coating composition of the invention comprises a hydrophobically modified non-high amylose starch wherein the starch base material is a native starch having an amylose content of less than about 40% by weight and the starch is modified with a hydrocarbon group of 6 to 18 carbon atoms.

One aspect of the invention is directed to a paper product resistant to oil and grease having a coating which comprises a hydropbically modified starch having an amylose content of less than about 40% by weight wherein the fluidity of the base starch has a gel strength of greater than 500 grams/in$^2$.

The paper products of the invention preferably comprise a coating containing a modified starch having the formula:

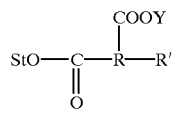

where St is a starch having an amylose content of less that about 40%, R is dimethylene or trimethylene, R' is a hydrocarbon group of 6 to 18 carbon atoms and Y is H, alkali metal, alkaline earth metal or ammonium.

In a preferred embodiment, the paper product is a food container.

Yet another aspect of the invention is directed to a method of preparing a coated paper product having good barrier properties comprising a) providing a coating composition comprising a hydrophobically modified starch having an amylose content of less that about 40% by weight and wherein the fluidity of the starch prior to modification has a gel strength of greater than 500 grams/in$^2$, b) applying the coating composition to a paper substrate, and c) drying the coated substrate to remove moisture and provide the coated paper product.

A preferred coating for use in the practice of the invention is an aqueous solution having a total solids content of from about 2 to about 25% by weight.

DETAILED DESCRIPTION OF THE INVENTION

The disclosures of all references cited herein are incorporated in their entireties by reference.

The term "coating" as used herein, refers to any surface treatment applied to paper. "Barrier" properties refer to an increase in the resistance of paper to various materials such as air, oil, grease, and also higher surface strength. The composition of the invention provides a paper surface treatment composition comprising a hydrophobically modified, high gel strength starch that when applied to paper products provides an especially good barrier to oil- and grease-like materials.

Paper products are defined herein as any article of manufacture, at least a portion of which comprises paper coated in accordance with the invention. The paper product may be made totally of paper or partially of paper. The invention encompasses paper products made of either single or multiple layers, e.g., a paper laminate, plastic/paper laminate. The coating may be applied on one or both sides, and may be coated on the side to be laminated. As the coating is made of food grade ingredients, paper products designed to receive food may, if desired, be coated on the side which will be in direct contact with food.

Paper products to be treated with the composition of the invention or made with paper treated in accordance with the invention include, but are not limited to laundry soap boxes, fabric dryer sheet containers, industrial wraps and food containers. As the composition of the invention is formulated from food grade ingredients, a preferred embodiment will be food containers. Food containers are defined herein as including any wrapper, bag, box, cup or other paper product capable of covering, holding or containing a food product, whether hot or cold, wet or dry. Examples include but are not limited to hamburger wrappers, candy wrappers, pizza and cereal boxes, and bags for potato chips, peanuts and pet food.

The coating composition of the invention comprises a hydrophobically modified non-high amylose starch. The starch is hydrophobically modified with hydrocarbon groups of at least 6 carbon atoms, preferably 6 to 18 carbon atoms, and preferably 8 to 12 carbon atoms. This hydrophobically modified starch can be prepared by reacting starch and an organic anhydride reagent and has the formula:

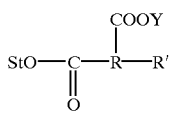

where St is the non-high amylose starch base material, R is a dimethylene or trimethylene group, R' is a hydrocarbon group of 6 to 18 carbons and Y is H, alkali metal, alkaline earth metal or ammonium. The hydrocarbon or hydrophobic substituent group R' may be alkyl, alkenyl, aryl, aralkyl or aralkenyl, preferably alkyl or alkenyl and more preferably alkenyl.

Preferred organic anhydrides include octenyl succinic anhydride, dodecenyl succinic anhydride and hexadecenyl succinic anhydride. While octenyl succinic anhydride (OSA)-modified starch, e.g., OSA-modified tapioca, is one preferred embodiment, and is exemplified herein, the invention is not limited thereto.

The amount of the derivative group bound to the starch, i.e.,

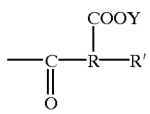

will be from about 1 to 10% and preferably from about 2 to 3% by weight, based on the weight of dry starch.

It is well known that starch is composed of two fractions, the molecular arrangement of one being predominantly linear and the other being highly branched. The linear fraction of starch is known as amylose and the branched fraction amylopectin. Starches from different sources, e.g. potato, corn, tapioca, sago, rice, etc., are characterized by different relative proportions of amylose and amylopectin components. Some plant species have been genetically engineered or modified by classical hybrid breeding and are characterized by a large preponderance of one fraction over the other.

The starch material used as the starting base material in this invention will be a non-high amylose starch, i.e. one containing less than about 40% by weight of amylose. By "base" starch is meant raw or native starch, i.e., starch as it comes from the plant source. Such base starch include natural starches as well genetically altered and hybrid starches. Suitable starches which may be used to practice the invention are any starches with an amylose content of less than about 40%, particularly preferred starches have an amylose content of from about 15% to about 30%. In addition, the base starch should have a peak gel strength (the water fluidity which exhibits the maximum gel strength) of at least 500 g/in$^2$ (the weight required to break the gel).

Starches which may be used to practice the invention include those derived from any plant species which produces or can be made to produce a high gel strength starch, e.g. potato, tapioca or sago. Once the high gel strength starch is modified, the ability to form a gel will be lost, but the coating can still form a network which will stay on the surface of the paper and improve film properties.

Starches for use in accordance with the invention may be degraded by any means known in the art. Particularly suitable starches are conversion products, including fluidity or thin-boiling starches prepared by oxidative hydrolysis, acid hydrolysis, enzyme conversion, heat and/or acid dextrinization, or a combination thereof, as are products made from blends thereof. Particularly suitable conversion products are those prepared by oxidation or acid conversion.

In commercial practice, starch is ordinarily converted by acid or enzyme conversion techniques. One developed process for degradation of granular starch involves a process employing hydrogen peroxide and a manganese salt catalyst such as potassium permanganate in alkaline slurry.

In the preparation of converted starches by acid treatment, the granular starch base is hydrolyzed to the required viscosity in the presence of an acid, such as sulfuric or hydrochloric acid, at a temperature below the gelatinization point of the starch. The starch is slurried in water and the acid, usually in concentrated form, is then added. Typically the reaction takes place over an 8 to 16 hour period, after which the acid is neutralized with alkali (e.g., to a pH of 5.5) and the starch recovered by filtration.

The converted starch may alternatively be prepared by enzyme treatment as known in the art. For example, the granular starch base may be slurried in water and the pH adjusted to about 5.6 to 5.7 with alkali or acid. A small amount of alpha-amylase enzyme (e.g., about 0.02% on the starch) is then added to the slurry, which is heated above the gelatinization point of the starch. When the desired conversion is reached, the pH is adjusted with acid (e.g., to about 2.0) to deactivate the enzyme and the dispersion is held at the pH for a period of at least 10 minutes. Thereafter the pH may be readjusted. The resulting converted starch is usually jet-cooked to ensure complete solubilization of the starch and deactivation of the residual enzyme. The type and concentration of the enzyme, the conversion conditions, and the length of conversion all will contribute to the composition of the resultant product. In the alternative, another enzyme or a combination of enzymes may be used.

Hydrogen peroxide may also be used on the starch as a converting (thinning) agent, either alone or together with metal catalysts. U.S. Pat. No. 3,655,644 discloses a method of thinning derivatized starch using hydrogen peroxide and a copper ion catalyst. U.S. Pat. No. 3,975,206 discloses an improved method for thinning starch employing hydrogen peroxide in combination with heavy metal salt catalysts such as iron, cobalt, copper or chromium, at an acid pH. This patent further lists a number of references directed to degrading (thinning) starch with hydrogen peroxide under a variety of conditions. U.S. Pat. No. 4,838,944 discloses a process for the degradation of granular starch using hydrogen peroxide and a catalytic amount of manganese salt, preferably potassium permanganate, in an aqueous slurry at a pH of 11.0 to 12.5. U.S. Pat. No. 5,833,755 discloses a process for degrading granular starch with hydrogen peroxide at a temperature below the gelatinization temperature of the starch, the steps comprise providing an aqueous slurry of granular starch at a pH of 11.0 to 12.5, adding an effective catalytic amount of a metal complex catalyst to the aqueous slurry, adding said hydrogen peroxide to the aqueous slurry in an effective amount to degrade the granular starch.

The preparation of hydrophobic starch derivative can be carried out by procedures known in the art. One such method is disclosed in U.S. Pat. No. 2,661,349, which describes hydrophobic starch derivatives such as starch alkyl or alkenyl succinates. The '349 patent describes an aqueous method in which such derivatives are prepared using a standard esterification reaction where the anhydride reagent and starch are suspended in water and mixed under alkaline conditions. Another method for preparing the hydrophobic starch derivatives is disclosed in U.S. Pat. No. 5,672,699. This patent describes a method for preparing hydrophobic starch derivatives having improved reaction efficiencies wherein the starch and anhydride reagent are predispersed or intimately contacted at low pH before being brought to alkaline reaction conditions. Other disclosures of the starch derivatives and the method of preparation can be found in "Starch: Chemistry and Technology", second edition, edited by R. L. Whistler et al., 1988, pp. 341–343 and "Modified Starches: Properties and Uses", edited by O. Wurzburg, 1986, Chapter 9, pp. 131–147.

The modified high gel strength starch may be further modified or derivatized to contain other groups in addition to the hydrocarbon chain as long as such groups do not interfere with the barrier or film forming properties provided by the hydrocarbon substituent and the starch itself. Usually these modifications are accomplished or provided prior to the modification with the hydrophobic or hydrocarbon group. Such starches include the conversion products derived from any of the former bases such as, for example, dextrins prepared by hydrolytic action of acid and/or heat; fluidity or thin boiling starches prepared by enzyme conversion, catalytic conversion or mild acid hydrolysis; oxidized starches prepared by treatment with oxidants such as sodium hypochlorite; and derivatized or modified starches such as cationic, anionic, amphoteric, non-ionic and crosslinked starches.

In the practice of the present invention, suitable starches are converted to a water fluidity (WF) of from about 40–80, particularly from about 45–75, more particularly from about 55–65. Water fluidity, as used herein, is an empirical test of viscosity measured on a scale of 0–90 wherein fluidity is inversely proportional of viscosity. Water fluidity of starches is typically measured using a Thomas Rotational Shear-type Viscometer (commercially available from Arthur A. Thomas CO., Philadelphia, Pa.), standardized at 30° C. with a standard oil having a viscosity of 24.73 cps, which oil requires 23.12±0.05 sec for 100 revolutions. Accurate and reproducible measurements of water fluidity are obtained by determining the time which elapses for 100 revolutions at different solids levels depending on the starch's degree of conversion: as conversion increases, the viscosity decreases and the WF values increase. Because of viscosity requirements, the concentration of the formulation in water will be from about 2 to 25%, preferably from about 5 to 15% and more preferably from about 7 to 12% solids by weight.

The coating and surface size composition of the present invention may be successfully utilized for coating and sizing paper and paperboard prepared from all types of both cellulosic and combinations of cellulosic with non-cellulosic fiber. Also included are sheet-like masses and molded products prepared from combinations of cellulosic and non-cellulosic materials derived from synthetics such as polyamide, polyester and polyacrylic resin fibers as well as from mineral fibers such as asbestos and glass. The hardwood or softwood cellulosic fibers which may be used include bleached and unbleached soda, neutral sulfite, semi-chemical, groundwood, chemi-groundwood, and any combinations of these fibers. In addition, synthetic cellulosic fibers of the viscose rayon or regenerated cellulose type can also be used, as well as recycled waste papers from various sources.

The starch coating or size dispersion is applied to a previously prepared paper or paperboard web by means of any conventional coating and surface sizing technique. These techniques include, but are not limited to, size press, tub, gate roll and spray applicators and calendar stack sizing procedures with spray and size press being preferred. Thus, for example, in a size press technique, surface sizing is accomplished by passing the web of paper between a pair of press rolls wherein the lower roll of the pair is rotating in a batch of the sizing dispersion. The surface of this roll picks up size and deposits it on the lower surface of the web. If desired, the coating or sizing may also be applied to the upper surface of the web by pumping it into the nip formed between the web and the upper roll, or by spraying it against the surface of the upper roll and allowing it to accumulate on the upper surface of the web as it enters the press. For example, the starch composition can be sprayed by pumping through a nozzle and atomizing and applying it uniformly to the sheet or web. Means of atomizing or misting by mechanical action may also be utilized. The coated or sized webs are then dried by means of any conventional drying operation selected by the practitioner to essentially remove all of the moisture.

All types of fillers, pigments, dyes and rheology modifiers may be added in the usual manner to the paper product which is to be coated or sized. Such materials include clay, talc, titanium dioxide, calcium carbonate, calcium sulfate and diatomaceous earth. Usually an effective additive amount of up to about 25% by weight can be used.

The starches of this invention are ordinarily employed in amounts to provide a coating ranging from about 0.25 to 15.0% by weight, dry basis, and preferably from about 0.5 to 5% by weight based on the weight of the finished dry paper. Within this range, the precise amount which is used will depend for the most part upon the type of pulp which is being utilized, the specific operating conditions, as well as the particular end use for which paper is desired. Multiple coats may be applied as desired to increase barrier properties, i.e., oil and grease resistance.

The use of the present starches as coatings and surface sizing agents results in paper characterized by improved water resistance, reduced porosity and increased oil resistance.

The following non-limiting examples serve to further illustrate and explain the invention. In the examples, all parts and percentages are given by weight and all temperatures are in degrees Celsius unless otherwise noted.

EXAMPLES

The following tests were used throughout the examples:
Water Fluidity

Water fluidity was measured using a Thomas Rotational Shear-Type Viscometer (commercially available by Arthur H. Thomas, Co., Philadelphia, Pa., USA), standardized at 30° C. with a standard oil having a viscosity of 24.73 cps., which oil requires 23.12.+/−.0.05 sec. for 100 revolutions. Accurate and reproducible measurements of the water fluidity were obtained by determining the time which elapsed for 100 revolutions at different solids levels depending on the starch's degree of conversion (as conversion increases, the viscosity decreases). The procedure used involved slurrying the required amount of starch (e.g., 6.16 g. dry basis) in 100 ml. of distilled water in a covered copper cup and heating the slurry in a boiling water bath for 30 min. with occasional stirring. The starch dispersion was then brought to the final weight (e.g. 107 g.) with distilled water. The time required for 100 revolutions of the resultant dispersion at 81–83° C. was recorded and converted to a water fluidity number as defined in Table 1.

TABLE 1

| Amount of Starch Used (anhydrous, g.) | | | | |
|---|---|---|---|---|
| 6.16[a] | 8.80[b] | 11.44[c] | 13.20[d] | |
| Time required for 100 revolutions (sec.) | | | | Water Fluidity |
| 60.0 | | | | 5 |
| 39.6 | | | | 10 |
| 29.3 | | | | 15 |
| 22.6 | | | | 20 |
| 20.2 | | | | 25 |
| | 33.4 | | | 30 |
| | 27.4 | | | 35 |
| | 22.5 | | | 40 |
| | | 32.5 | | 45 |
| | | 26.8 | | 50 |
| | | 22.0 | | 55 |
| | | | 24.2 | 60 |
| | | | 19.2 | 65 |
| | | | 15.9 | 70 |
| | | | 13.5 | 75 |
| | | | 11.5 | 80 |
| | | | 10.0 | 85 |
| | | | 9.0 | 90 |

[a], [b], [c] and [d] Final weight of starch solutions are 107, 110, 113, and 115 g., respectively.

Gel Strength Using a Texture Analyzer

Gel strength was measured using a texture analyzer model TA-XT2, commercially available from Texture Analyzer. Twenty grams of anhydrous starch were mixed with deionized water to obtain the desired percent solids starch slurry. The slurry was cooked in a boiling water bath for twenty minutes, stirring to keep the starch suspended until thickened, then covered without stirring. The cooked starch was poured into tubes, covered and allowed to cool to room temperature overnight to obtain gels which had a height of about 16 mm and a diameter of about 25 mm.

The starch gel was removed from the tube. The height and diameter of the gel were measured and entered into the texture analyzer. Two drops of silicon oil and then the gel were placed on the texture analyzer testing plate. Two additional drops of silicon oil were placed on top of the gel and the test was run using the following parameters.

Mode: Force/Compression
Option: Return to start
Pre-speed: 5.0 mm/sec
Speed: 0.8 mm/sec
Post-speed: 5.0 mm/sec
Force: N/A
Distance: 10.0 mm
Time: N/A
Count: N/A
Trigger: 0.05 N
PPS: 200.00
Probe: P50 50 mm diameter, Cylinder Aluminum

Example 1

Preparation of a Sago Fluidity Starch By Acid Conversion 500 grams native sago starch were slurried in 750 mls water and placed in a hot water bath with constant agitation. The temperature was brought up to and maintained at about 50° C. 2.0 grams hydrochloric acid (0.4% by weight of the starch) were added with mixing. After 16 hours, the pH was adjusted to 5.5 with a caustic solution. The starch was filtered, washed, and dried. The resultant sago starch had a WF of 43.

Fluidity sago starches having different water fluidities can be obtained by varying the amount of HCl.

Example 2

Preparation of Sago Fluidity Starch By Permanganate/Peroxide Conversion 1000 g of native sago starch was slurried in 1500 mls water. 0.8% (based on the starch) NaOH as 3% solution was slowly added to the slurry and then 0.005%(based on the starch) $KMnO_4$ as 2% solution was added. After mixing for 15 minutes, 2.0% (based on the starch) of hydrogen peroxide, 30% assay, was added. The reaction was held at 40° C. for about three hours until negative KI test, while maintaining a pH of greater than 11. After the reaction was over, the slurry was neutralized to pH=5.5 with 3:1 water-HCl, filtered, washed and air dried. The sample had a WF of 63.

Example 3

Gel Strength of Various Starch Bases and Water Fluidities

Fluidity starches of varying water fluidities were prepared using the procedure of Example 1 with sago, corn, tapioca and potato bases and varying the amount of HCl used for conversion. The gel strength of these starches was tested using a texture analyzer. Table 2 shows the gel strength at 10% solids.

TABLE 2

| Starch Type | Fluidity @ Max Gel Strength | Max Gel Strength (g/in$^2$) |
|---|---|---|
| Waxy | 60 | <20 |
| Corn | 65 | 410 |
| Potato | 58 | 950 |
| Tapioca | 57 | 1325 |
| Sago | 62 | 2750 |

Example 4

Hydrophobic Modification of Tapioca Starch

Octenylsuccinic anhydride treated tapioca fluidity starch was prepared as follows. 500 grams of fluidity tapioca (wf=57) were slurried in 750 ml water. The pH was adjusted to 7.5 using 3% sodium hydroxide. 15 grams of octenylsuccinic anhydride (OSA) were added in one-third increments every thirty minutes while maintaining the pH at 7.5 using 3% sodium hydroxide and constant agitation. The starch was then filtered out and washed with 750 ml water. The starch was then reslurried in 500 ml water and the pH adjusted to 5.5 with 3:1 hydrochloric acid. The starch was then filtered, washed with 750 ml water, and air dried.

Example 5

Application Process

The dispersed starch composition was applied to paper at a concentration of 10% by weight in water at a temperature of 65° C. using a modified ETM Multiple System Lab Coater, manufactured by Euclid Tool and Machine. The technique of application used is generally known as a metered sized press or film transfer size press, in which a "film" of the starch dispersion is applied to two oppositely rotating rolls. The paper passes between the two rolls where the starch film was then transferred to the base paper substrate. After application the paper was dried in an Omega/Arkay photographic drum drier. Application weight onto the paper was determined by weight difference between the untreated paper and the treated paper. The resulting paper samples were tested for physical properties using the following tests:

Gurley Porosity

Low-Pressure Gurley Density Testing (TAPPI Std. T460 as of 11/92). This test measures the air resistance of paper that permits the passage of 100 cc of air through a paper section covering the orifice of the Gurley Densitometer in 5 to 1800 seconds. The result of this test, when reported as seconds per 100 cc of air per square inch opening, is commonly referred to as Gurley seconds.

TAPPI UM-557

This test or "The 3M kit" is used to examine the effect of viscosity and polarity on the ability of the treated paper to resist penetration and wicking of oily substances.

Five sheets of each sample were tested and the average reported in Table 3. Table 3 shows the correlation between gel strength and oil resistance and gurley porosity.

TABLE 3

| Starch type/w.f. | Gurely Porosity | 3M kit Value |
| --- | --- | --- |
| Waxy*/60 | 2793 | 3.9 |
| Corn*/65 | 2468 | 3.7 |
| Potato*/58 | 3346 | 4.3 |
| Tapioca*/57 | 3498 | 5.7 |
| Sago*/62 | 4052 | 6.3 |

*= modified with 3% OSA as per Example 4

Many modifications and variations of this invention can be made without departing from its spirit and scope, as will be apparent to those skilled in the art. The specific embodiments described herein are offered by way of example only, and the invention is to be limited only by the terms of the appended claims, along with the fill scope of equivalents to which such claims are entitled.

What is claimed is:

1. A paper product resistant to oil and grease having a coating which comprises a hydrophobically modified starch wherein the hydrophobically modified starch is prepared from a fluidity base starch containing less than about 40% by weight of amylose and having a maximum gel strength of at least about 500 g/in$^2$.

2. The product of claim 1 wherein the modified starch has the formula:

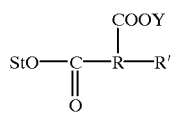

where St is a starch having an amylose content of less that about 40%, R is dimethylene or trimethylene, R' is a hydrocarbon group of 6 to 18 carbon atoms and Y is H, alkali metal, alkaline earth metal or ammonium.

3. The product of claim 2 wherein from about 1 to 5% by weight of the

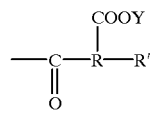

group is bound to the starch, based on the dry weight of the starch.

4. The product of claim 3 wherein R is dimethylene and R' is a hydrocarbon of 8 to 12 carbon atoms.

5. The product of claim 4 wherein the starch has an amylose content of less than 30%.

6. The product of claim 5 where R' is an alkyl or alkenyl group.

7. The product of claim 6 wherein the composition contains about 2 to 3% by weight of the bound R' group.

8. The product of claim 1 wherein the starch is tapioca.

9. The product of claim 1 wherein the starch is sago.

10. The product of claim 1 which is a food container.

11. A method of preparing a coated paper product having barrier properties comprising:

a) providing a coating composition comprising a hydrophobically modified starch wherein the hydrophobically modified starch is prepared from a fluidity base starch containing less than about 40% by weight of amylose and having a maximum gel strength of at least about 500 g/in$^2$, b) applying the coating composition to a paper substrate, and c) drying the coated substrate.

12. The method of claim 11 wherein the modified starch has the formula:

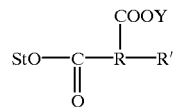

where St is a starch having an amylose content of less that about 40%, R is dimethylene or trimethylene, R' is a hydrocarbon group of 6 to 18 carbon atoms and Y is H, alkali metal, alkaline earth metal or ammonium.

13. The method of claim 11 wherein the coating composition is in aqueous solution having a total solids content of from about 2 to about 25% by weight.

14. The method of claim 13 wherein the coating composition is in aqueous solution having a total solids content of from about 5 to about 15% by weight.

15. The method of claim 14 wherein the coating composition is an aqueous solution having a total solids content of from about 7 to about 12% by weight.

16. The method of claim 11 wherein the starch is tapioca.

17. The method of claim 11 wherein the starch is sago.

* * * * *